Patented Oct. 24, 1944

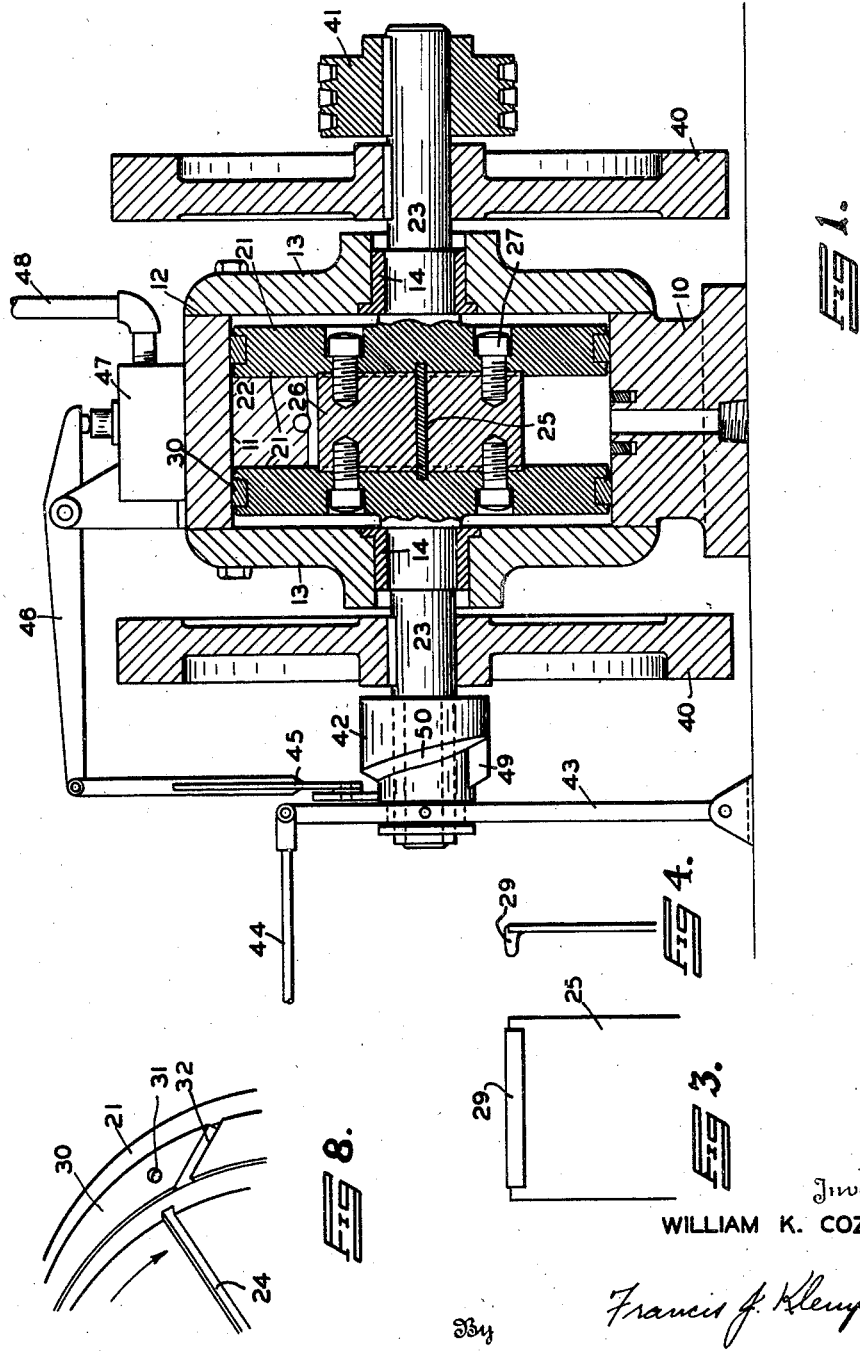

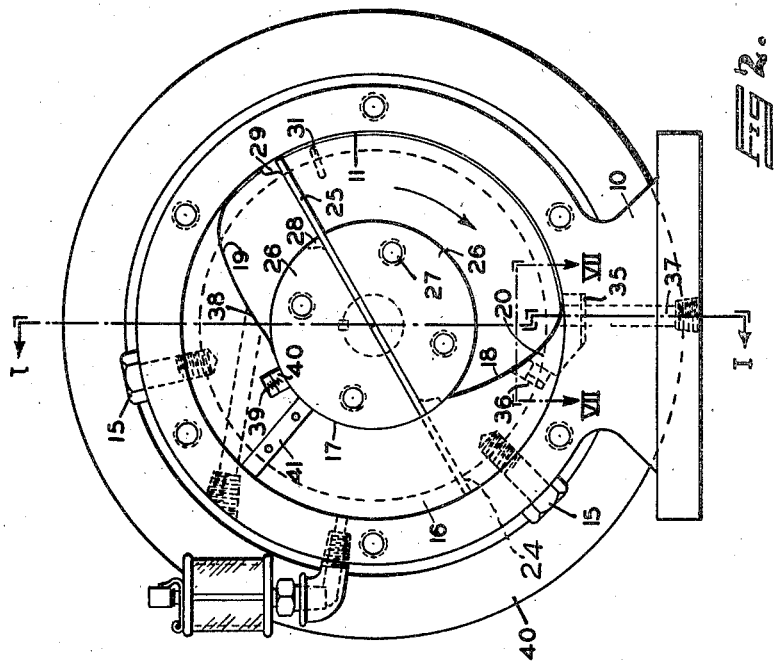
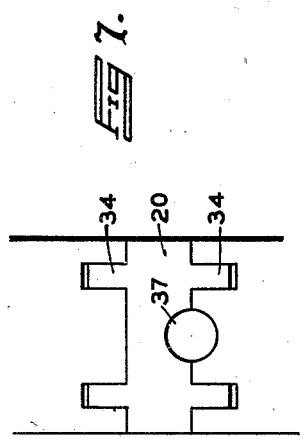
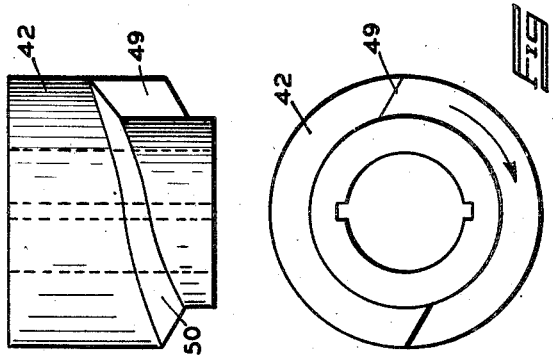
Inventor
WILLIAM K. COZAD

2,361,273

UNITED STATES PATENT OFFICE 2,361,273

ROTATING MACHINE

William K. Cozad, Mercer, Pa.

Application October 11, 1941, Serial No. 414,635

2 Claims. (Cl. 121—82)

This invention relates to a rotating machine and more particularly to a rotary apparatus which is operative to translate steam or other static or dynamic fluid energy into rotating mechanical energy or alternatively to translate mechanical energy into fluid pressure and/or the flow of fluids through conduits. Thus the invention is applicable in the design and construction of either rotary engines or rotary pumps although as will more fully appear hereinafter the invention offers certain additional substantial advantages in connection with the first mentioned purpose.

An object of the invention is the improvement and simplification in the design and construction of apparatus of the general kind mentioned while nevertheless providing a machine of substantially improved performance characteristics. This is brought about principally by employing a pair of diametrically opposed radial pistons and by forming these pistons of a unitary piece of metal which is the only reciprocating part in the rotary assembly. The apparatus is so constructed that the member forming the pistons is of simple design and of little weight whereby it may be reciprocated with less force and the attendant vibration reduced to a minimum. Moreover the member extends diametrically across the center of the rotating assembly thus providing an inherent dynamic counterbalance to maintain the centrifugal forces imparted to the pistons within reasonable limits.

A further object of the invention is the provision in a rotary engine or pump of an improved cradle or support for the radially movable pistons of the rotating assembly which cradle or support includes an inherent arrangement for effectively sealing the side edges of the pistons against the leakage of fluids. Moreover the arrangement is such that the pressure of the fluids employed aids in tightening the seals and by constructing the vane or member constituting the pistons in a particular manner the radially outward ends of the pistons are sealed by the fluid flow through the machine as well as by centrifugal force imparted to the piston by rotation of the same.

Another object of the invention involves the improvement in the construction of the side walls of the compression chambers in the rotating assembly. These walls are made to rotate along with the pistons and are provided with circular peripheries whereby the problem of sealing between the pistons and the walls and between the rotating walls and the stationary parts of the apparatus is simplified. The invention also provides an improved arrangement for providing the seals between the rotating walls and the stationary parts and this is accomplished by employing expansible rings which are keyed to and rotate with the walls, with the openings in the rings positioned at points of zero pressure.

Yet another object of the invention is the provision of improved methods for reciprocating the pistons radially as required in a machine of the kind involved.

The above and other objects and advantages of the invention will become apparent from a consideration of the following detailed specification and the accompanying drawings wherein there is specifically disclosed a preferred embodiment of the invention.

In the drawings:

Figure 1 is a longitudinal section with parts shown in elevation of an apparatus constructed in accordance with the principles of the invention;

Figure 2 is an end elevation of the apparatus of Figure 1 with the left hand parts 13 and 21 removed;

Figures 3 and 4 are plan and side views, respectively, of an end of the piston vane employed in the apparatus;

Figures 5 and 6 are plan and end views, respectively, of a valving cam which may be utilized in the apparatus;

Figure 7 is a fragmentary plan view along the line VII—VII of Figure 2; and

Figure 8 is a perspective view of a portion of the expansible sealing ring mentioned above.

The apparatus of the invention in its preferred and illustrated embodiment includes a frame or housing 10 which is accurately bored or machined to provide a finished cylindrical surface 11. At either end of the bore 11 the body 10 is machined to provide a spaced parallel plane surface 12 against which is bolted a housing 13 and each of the housings 13 carries a bearing or bushing 14. Bushings 14 are accurately aligned axially and provide the support for the rotating assembly of the machine.

Rigidly secured within a portion of the bore 11 by the bolts 15 and equidistant from each of faces 12 is a block 16 having a substantially centrally disposed semi-cylindrical surface 17 and cam surfaces 18 and 19 at the circumferential ends of the semi-cylindrical surface. Cam 18 which will for convenience be referred to as the rising cam may be made to curve integrally into the curve of the bore 11 but for reasons to be hereinafter explained the lower part of the cam is preferably formed of a separate block of metal 20. Cam 19 which will hereinafter for convenience be referred to as the receding cam curves smoothly off the surface 17 and onto the bore 11 as indicated in Figure 2 of the drawings. The requirements of the curves of the cams 18 and 19 will be described below.

Positioned within the bore 11 and on either side of the block 16 is a disk-like member 21 provided with an annular recess 22 in its outer periphery and an outwardly extending shaft 23 which may be formed integrally therewith. As shown in Figure 1 shafts 23 are journaled in the bushings 14 carried in the housings 13. The inner face of each of the disks 21 is provided with a diametrically extending slot 24 adapted to receive the side edges of the piston vane 25.

Interposed between the disks 21 are a pair of identical and substantially semi-cylindrical blocks 26 which when assembled as indicated in figures 1 and 2 fit accurately within the surface 17 of the block 16. Blocks 26 are spaced apart radially sufficient to allow the vane 25 to freely slide therebetween. Disks 21 and blocks 26 are rigidly assembled by the bolts 27 and when assembled as shown in the drawings provide a spool-like structure with the block 16 contained within the side walls of the spool. Each of the blocks 26 is provided with an axially extending recess 28 to receive the lips 29 formed on each end of the piston vane 25 so that the outer surface of the blocks 26 may be maintained in close fitting relation with the surface 17 of the block 16.

Vance 25 consists of a flat metallic bar having a lip 29 projecting laterally of the plane of the bar at each end of the bar but in opposite directions as indicated in Figure 2. By referring to Figure 3 it will be apparent that the lips 29 do not extend the full width of the bar so that when the parts are assembled as explained above with the side edges of the bar 25 received in the slots 24 the ends of the lips 29 will slide against the inner faces of the disks 21. Also as shown in Figure 2 the outer peripheral surfaces of the lips 29 correspond in general with the curve of the bore 11 to provide an extended bearing surface area between the lips and the bore.

Received in each of the annular recesses 22 in the disks 21 is an expansible ring 30 which is keyed against circumferential movement relative to the disk by a recessed pin 31 as indicated in Figure 8. Pin 31 is so oriented with respect to the break 32 in the ring that the break is positioned just ahead of the circumferential position of one end of the piston vane 25. Rings 30 are accurately fitted within the recesses 22 and are normally maintained in compression by the surface of the bore 11. This provides a circumferentially continous seal between the disks 21 and the outside of the machine with the exception of the break 32 but since these breaks are positioned in zones of zero or negative pressure the machine is practically and effectively sealed.

The lower or first part of the rising cam 18 which receives the successive impacts of the extended end of the piston vane 25 and begins to move the same linearly upon rotation of the machine is preferably constructed as a separate member 20 of hardened tool steel and to insure a smooth transgression from the curve of the bore 11 to the curve of cam part 20 and from the curve of the latter to the cam 18 member 20 is provided with outwardly extending lugs 34 which spline into suitable slots milled in the position 10 and 16. Member 20 is cushioned against radially outward shock and circumferentially directed shock in one direction by pads 35 and 36 made of fibrous or other suitable material. Approximately at the beginning of the rising cam an exhaust port 37 extends from within the piston chamber to outside of the machine. An inlet port 38 is provided in the surface of the receding cam 19 at a point closely adjacent the outer periphery of the blocks 26. To the rear of port 38 and within the semi-cylindrical confines of the surface 17 an axially extending slot 39 is provided in the block 16 and received within slot 39 is a spring pressed bar 40 of graphite or other suitable material to provide a seal between surface 17 and the outer surface of blocks 28. Each side face of the block 16 is provided with a radially extended slot to receive a spring pressed sealing bar 41 to bear against the inner face of the adjacent disk 21. Bars 40 and 41 provide a seal for the pressure chamber of the machine to the rear of inlet port 38.

The curves of cams 18 and 19 are so correlated that as one end of the vane 25 rides up the cam 18 the tip of the lip 29 on the opposite end of the vane follows closely the path of the cam 19. To facilitate this operation the bases and tips of the lips 29 are rounded off as shown in Figures 2 and 4. The machine is constructed for rotating in the direction indicated in Figure 2 and it should be apparent that the force requirde to initiate the shuttling or linear movement of the vane 25 is opposed by the block 20. As the center of mass of the vane 25 moves through the axis of rotation of the machine the centrifugal force will change to a diameterical opposite direction thereby assisting the completion of the shuttling or linear movement. As a lip 29 passes the bore 28 the dynamic flow of steam or other fluid through the port will act against the radially inner surface of the lip and hold the same in pressure engagement with the cam 19 and later with the bore 11. In this manner the pressure chamber is effectively sealed against leakage in a forward direction. It should be noted that the pins 31 and ring breaks 32 are forward of the vane 25. It should also be observed that as pressure comes onto one face of the vane 25 the side edges of the vane will be forced into pressure engagement of the side edges of the slots 24 in the disks 21 thereby preventing leakage between the vane and the disks.

An important advantage of the construction of the invention is that by reason of the manner in which the vane 28 is supported the vane may be constructed of a relatively thin piece of flat stock and as such possesses little mass or inertia during operation of the machine. Moreover since it always extends in opposite directions from its axis of rotation it is inherently counterbalanced and all these factors taken together enable the vane to be shuttled back and forth without undue impacts or excessive wear on any part of the mechanism. Also the arrangement provides an exceedingly simple method of effecting a plurality of power impulses for each revolution of the machine.

The apparatus described above may be employed either as a pump or as an engine and when employed for the latter purpose may be supplied with any fluid under pressure. It is, however, particularly adaptable for use as an expansion steam engine and for this purpose the shafts 23 may be each provided with a flywheel 40, one of the shafts additionally with a driving pulley 41, and the other of the shafts additionally with a cam 42 which is feathered on the shaft. The axial position of the cam 42 may be adjusted by a lever 43 having a control rod 44. Associated with cam 42 is a follower 45 which through coupling 46 operates a valve 47 for controlling the supply of steam from a supply conduit 48 to the inlet port 38. The operation is such that when follower 45 is raised, steam is admitted but when follower is in lowermost position as shown in Figure 1, the supply of steam is cut off. Cam 42 is provided with a pair of diametrically opposed but axially extending lifting surfaces 49 and extending from the outer end of one of the surfaces 49 to the inner end of the other of the surfaces 49 is a lowering surface 50. Surfaces 49 are so oriented with respect to the vane 25 that as an end thereof clears port 38 steam is admitted and the duration of steam admission in each of the two cycles of each revolution is determined by the adjusted axial position of the cam 42. By moving the cam further to the left as viewed in Figure 1, the steam is admitted for longer lengths of time. The dynamic inrush of the steam forces the lip 29 into pressure engagement with wall of the bore 11 as explained above and centrifugal force will maintain the seal between these parts. After the closing of valve 47 the steam in the pressure chamber between the vane 25 is free to expand thus releasing its energy to the vane and moving the same to effect rotation of the machine.

It should now be apparent that I have provided improvements in a rotary engine or pump which accomplishes the objects initially set out. The apparatus is simple in design and construction, involving the use of but two moving parts—the vane and its carriage, and by reason of the vane and cylinder arrangement is capable of delivering a large quantity of power when used as an engine or a large quantity of fluid under pressure when used as a pump while requiring mechanical parts of but small dimensions. This results from the fact that two displacements take place each revolution and that these displacements are of substantial volume. The latter feature renders the machine well suited for use as an expansion steam engine and it should be observed further that a substantial moment arm is quickly attained and is then constant for a substantial part of each half revolution. The application of power to the driven shafts therefore continues through substantially all of the angular distance of each half and full revolution, resulting in an increase in power output and smoother operation of the machine.

In the illustrated embodiment, lubrication of the parts exposed to the displacement chamber may be readily accomplished by injecting a lubricant into the steam or other fluid passing through the chamber while the rings 22 may each be lubricated by an oiler carried by the body 10 as shown in Figure 2. It should be noted that the passage providing communication between the ring 22 and the oiler is positioned at a point of neutral or zero pressure whereby the maintenance of a film of oil between the ring and the cylinder is facilitated.

The above specifically described embodiment of the invention should be considered as illustrative only as obviously many changes may be made therein without departing from the spirit or scope of the invention. For example, it is contemplated that cam means other than that specifically illustrated may be employed to shuttle the vane 25. Various other modifications readily suggest themselves and reference should therefore be had to the appended claims in determining the scope of the invention.

What I claim is:

1. A rotating machine comprising in combination a cylinder, a carriage within said cylinder and mounted for rotation about the longitudinal axis thereof, a unitary piston vane mounted on said carriage for radial sliding movement, an arcuately shaped assembly disposed within said cylinder and having a cam surface extending from the curve of the cylinder wall to a point spaced radially inward of the cylinder wall, said assembly including a separable block on which is formed that part of the cam surface which is contiguous to the cylinder wall, and means to insulate said block against shock imparted by the outer end of said vane as the latter reaches said cam during its rotational movement.

2. Apparatus according to claim 1 further characterized in that said cylinder wall is slotted, said block being provided with fingers which are splined into said slots.

WILLIAM K. COZAD.